(12) United States Patent  (10) Patent No.: US 9,411,774 B2
Campbell  (45) Date of Patent: Aug. 9, 2016

(54) MEMORY ACCESS CONTROL

(71) Applicant: ARM Limited, Cambridge (GB)

(72) Inventor: Michael Andrew Campbell, Cambridge (GB)

(73) Assignee: ARM Limited, Cambridge (GB)

( * ) Notice: Subject to any disclaimer, the term of this patent is extended or adjusted under 35 U.S.C. 154(b) by 753 days.

(21) Appl. No.: 13/868,180

(22) Filed: Apr. 23, 2013

(65) Prior Publication Data

US 2014/0317360 A1  Oct. 23, 2014

(51) Int. Cl.
  *G06F 12/00* (2006.01)
  *G06F 13/00* (2006.01)
  *G06F 13/28* (2006.01)
  *G06F 15/167* (2006.01)
  *G06F 12/02* (2006.01)
  *G06F 12/06* (2006.01)
  *G06F 13/16* (2006.01)

(52) U.S. Cl.
  CPC .......... *G06F 15/167* (2013.01); *G06F 12/0207* (2013.01); *G06F 12/0623* (2013.01); *G06F 13/1615* (2013.01)

(58) Field of Classification Search
  CPC .............. G06F 15/167; G06F 13/1615; G06F 12/0207; G06F 12/0623
  USPC ........................................................ 711/158
  See application file for complete search history.

(56) References Cited

U.S. PATENT DOCUMENTS

| 6,571,325 | B1 | 5/2003 | Satagopan et al. |
| 7,343,457 | B1 | 3/2008 | End, III |
| 2003/0030476 | A1* | 2/2003 | Cowles ............... H03K 19/007 327/318 |
| 2004/0103249 | A1* | 5/2004 | Lin ..................... G06F 13/4059 711/118 |
| 2007/0162670 | A1* | 7/2007 | Yang ....................... G11C 5/04 710/100 |
| 2007/0201295 | A1* | 8/2007 | Lines ..................... G11C 5/14 365/230.03 |
| 2007/0294470 | A1 | 12/2007 | Van Dyke et al. |

OTHER PUBLICATIONS

International Search Report and Written Opinion of the International Searching Authority mailed May 26, 2014 in PCT/GB2014/051085.
O. Mutlu et al, "Stall-Time Fair Memory Access Scheduling for Chip Multiprocessors" Dec. 2007, 13 pages.
S. Rixner et al, "Memory Access Scheduling" *ISCA-27* (2000), 2000, pp. 1-11.

* cited by examiner

*Primary Examiner* — Charles Rones
*Assistant Examiner* — Sidney Li
(74) *Attorney, Agent, or Firm* — Nixon & Vanderhye, P.C.

(57) ABSTRACT

Memory access circuitry controls access to multiple memory units with two access units. Arbitration circuitry forwards memory access requests for one memory unit to a first access unit, for a further memory unit to a second access unit, and for yet further memory unit to one of the first or second access units. The access units store requests in a queue prior to transmitting them to the respective memory unit. Tracking circuitry tracks requests and determines when to transmit subsequent requests from the queue. Control circuitry sets a state of each access unit to one of active, prepare and dormant, switches states of the two access units periodically, and does not set more than one access unit to the active state at the same time.

21 Claims, 6 Drawing Sheets

MEMORY ACCESS CONTROL

TECHNICAL FIELD

The technical field relates to the field of accessing memory.

BACKGROUND

With a requirement to store ever increasing amounts of data within memory, accessing this data in a way that is quick, area efficient and does not have too high a power requirement is an increasing problem. Accessing speeds for memories are dictated by the timing parameters of the memories and the traffic to the memory. Many memories such as DRAM, require lines to be activated before they can be accessed. Activating a line involves large amounts of charge being loaded into the device and the properties of the memory therefore impose a limit on the frequency with which this can be done.

Thus, generally in such memories there is a limit on the number of activate commands that are allowed within a certain amount of time. In order to increase accessing speeds multi-rank DRAM have been provided, in which the different ranks are accessed by the same bus but each rank has its own timing restrictions, such that when one has met the limit for accessing one rank the other can be accessed. However, switching between ranks has its own costs and thus, should be managed carefully.

A further problem with accessing memories that are divided into different ranks or units, each with their own properties, is that accesses to each unit or rank need to be tracked and controlled so that the individual properties of each unit are not violated. Particularly careful tracking needs to be performed in memories such as DRAM where there is no back pressure applied from the memory. Where there are several memory units with their own properties each needs to be tracked. These tracker devices are fairly complex and add to the area of the device, thus as memories scale up and the number of units or ranks increases, providing a tracker for each unit or rank has a heavy area cost.

It would be desirable to be able to provide a memory divided into individual units or ranks such that access timing restrictions can be alleviated without requiring too much additional control circuitry.

SUMMARY

A first aspect provides a memory access circuitry for controlling access to a memory comprising multiple memory units arranged in parallel with each other, said memory access circuitry comprising:

two access units each configured to select one of said multiple memory units in response to a received memory access request and to control and track subsequent accesses to said selected memory unit, said multiple memory units comprising at least three memory units;

arbitration circuitry configured to receive said memory access requests from a system and to select and forward said memory access requests to one of said two access units, said arbitration circuitry being configured to forward a plurality of memory access requests for accessing one memory unit to a first of said two access units, and to direct a plurality of memory access requests for accessing a further memory unit to a second of said two access units and to subsequently direct a plurality of memory access requests for accessing a yet further memory unit to one of said first or second access units;

said two access units comprising;

storing circuitry to store requests in a queue prior to transmitting said requests to said respective memory unit; and tracking circuitry to track said requests sent to said respective memory units and to determine when to transmit subsequent requests from said queue;

wherein said control circuitry is configured to set a state of each of said two access units, said state being one of active, prepare and dormant, said access unit in said active state being operable to transmit both access and activate requests to said respective memory unit, said activate request preparing said access in said respective memory unit and said access request accessing said data, said access unit in said prepare state being operable to transmit said activate requests and not said access requests, said access unit in said dormant state being operable not to transmit either said access or said activate requests, said control circuitry being configured to switch states of said two access units periodically and to set not more than one of said access units to said active state at a same time.

The technology described herein recognises that where a memory is divided into different units, each of which needs to be tracked when accessed, then the provision of two access units each with their own tracking circuitry, allows two memory units to be tracked at the same time, such that activate tasks can be performed for one unit, where the other unit has no more capacity to receive activate tasks due to performance constraints. This ability to switch the activate tasks to a different memory unit reduces latency in memory accesses. In effect having two memory units, which are allowed to be in an active and prepare state at a same time, allows some activate requests to be processed during time periods that the active memory unit can no longer be accessed as performance limits have been reached. Thus, rather than simply waiting for more capacity to be available or switching to a different unit, which has its own latency costs, activate commands can be processed at a different unit.

By providing memory units only one of which can be active at any one time, potential problems that might arise were both access units allowed to access the memory at the same time do not arise. These problems might arise due to the data accesses from the different access units which use the same bus to access the memory units, having different analogue delays and thus, either requiring additional delays between the accesses or risking some overlap occurring.

In effect this structure allows a funnelling of requests into a pipelined structure that enables memory unit management in a deterministic and power-enhanced manner without undue detriment to latency.

Although in many cases two access units are sufficient to increase performance by providing an efficient interleave, in some cases it may be advantageous to provide more than two access units such that more than two memory units are actively tracked at any one time. The number of access units provided will always be less than the number of memory units to be accessed. Only one of the access units would be active at any one time, with the others either dormant or in the prepare state. The one in the prepare state that is selected to be active at the point of turnaround would be arbitrated using a temporal, fair share or other priority scheme.

In some embodiments, said two access units are configured to respond to receiving an access request to a different memory unit than previous access requests requested access to, to complete said previous access requests and to switch to said prepare state.

The arbitration circuitry will select a plurality of high priority access requests to a same memory unit and transmit them to a particular access unit such that it can access that memory unit during several subsequent accesses. It is desirable to have several accesses to the same memory unit performed consecutively so that the frequency of switching between memory units which takes time and power is reduced. When the arbitration circuitry determines from the priority of pending requests that a different memory unit should be accessed then several requests to the different memory unit are sent to one of the access units.

The access unit that receives these requests will complete all the access requests it has pending to the previously accessed memory unit and will then enter the prepare state during which the other access unit can be active and accessing the memory. The access unit that has entered the prepare state can then perform control steps to render the previously accessed memory unit dormant and select the different memory unit of the newly received requests. In this regard, when switching between memory units there is a time delay associated with the switch due to powering down one memory unit and powering up the other and the latency of this switching can be hidden to some extent if the access unit is placed in the prepare state during this process such that the other access unit can be rendered active and access the memory during this time where it has pending data accesses.

In some embodiments, following completion of said previous access requests said tracking circuitry of said two access units are configured to track requests to said different memory unit.

The tracking circuitry of the access unit is configured to track requests to a particular memory unit and therefore, on switching memory units it will track requests to the new memory unit. In this way, two tracking circuits may be sufficient for the multiple memory units in cases where there are only two access units and therefore only two memory units that are available at any one time.

In some embodiments, said control circuitry is configured to set one of said two access units to said active state and one of said two access units to said prepare state and to switch said two access units between said prepare and said active states in response to not receiving an access request from said active access unit during a predetermined time.

Where large amounts of data are accessed in response to each access request, then the restricting requirement for accessing the memory may not be the activation of the lines but the accessing of the data and in such cases one of the access units may be active and the other dormant at one particular time. However, where smaller amounts of data are accessed for each access request then the allowed frequency of activation requests is the most restrictive requirement. In such a case, it is advantageous if one of the access units is in the active state and the other in the prepare state. This allows activation requests to be sent from the access unit in the prepare state where the active unit is not using the bus due to its tracking circuitry having determined that the memory unit has no capacity to receive requests currently. In this regard, the memory unit will generally allow a certain number of activate requests within a particular time cycle. This is because activate requests have high charge requirements and the charge pumps associated with each memory unit can only perform a certain number of activates within a time period. Thus, when this number of activates has been processed by the memory unit receiving requests from the active access unit and the time cycle is still running another memory unit can receive and process activate requests sent from the access unit in the prepare state and the time cycle can be efficiently used.

In some embodiments, said two access units are configured to respond to receiving an access request to a different memory unit than previous access requests requested access to, to transmit a refresh and hibernate signal to said memory unit previously accessed and to transmit a select signal to said memory selecting said different memory unit.

Where an access request for a different memory unit is received then the previous memory unit is refreshed and hibernated such that the data is securely stored and power consumption is reduced. A select signal is then sent to the memory to select the different memory unit.

In some embodiments, said two access units each comprise a prepare queue and an access queue arranged in parallel, requests corresponding to said received access requests being stored in both said prepare and access queue, requests transmitted from said prepare queue triggering activation of a memory line of said request and requests transmitted from said access queue triggering an access to said memory line of said request.

As the activation of a memory line may be the restricting factor when accessing memory it may be advantageous if there is a prepare queue for these activate requests and an access queue for the access requests. In this regard, in many systems an activate request may require several cycles to complete and a delay may be required following these cycles before the access request that generally takes fewer cycles can be processed. Having the requests stored in separate queues allows the tracking circuitry to track when each is ready to be sent from the particular queue.

In some embodiments, the memory access circuitry comprises interface control circuitry associated with said two access units, said interface control circuitry selecting an access request to transmit to said memory from one of said two access units, said interface control circuitry being configured to preferentially select a valid access request from said access unit in said active state, then a valid activate request from said access unit in said active state and then a valid activate request from said access unit in said prepare state.

The selection of access requests for transmitting to the memory may be made by interface control circuitry which will preferentially select a valid access request from the access unit in the active state and if there is none available then a valid activate request from the access unit in the active state will be selected and if there is none available then a valid activate request from the access unit in the prepare state will be selected.

In some embodiments, said tracking circuitry is configured to set a pending request at a front of said prepare and access queues to valid or invalid in dependence upon tracked previous requests sent to said memory unit and properties of said memory unit.

The setting of the pending requests to valid will be performed by the tracking circuitry which will determine when the memory unit is ready and has capacity to receive such a request.

In some embodiments, said two access units are configured to transmit an issue signal to said control circuitry on issuing one of said requests from said access queue, said control circuitry determining capacity of said two access units to receive said requests in dependence upon said issue signals.

In order to be able to track the number of requests within an access queue it is important that the control circuitry knows when requests join a queue and requests leave the queue. Therefore, the access unit will transmit an issue signal to the control circuitry on issuing one of the requests from the access queue such that the control circuitry can determine the capacity of the queue and can determine when new requests can be sent to the queue and indeed when the queue is empty.

In some embodiments, said control circuitry comprises two credit counters each configured to count to a size of said access queue in a respective one of said two access units, a value stored in each of said two credit counter being indicative of availability in said respective access queue, said credit counter value being changed in response to a number of access requests sent to said respective access queue and a number of said issue signals received from said respective access units.

One way of determining the capacity of the queue is to use credit counters which count access requests joining the queue and access requests leaving the queue. For example, the counter could be incremented when access requests join the queue and decremented when they leave. In such a way when the credit counter value reaches zero one knows that the queue is empty.

In some embodiments, said arbitration circuitry is configured in response to detecting said credit counter value indicating an empty access queue to select one of said pending access requests of a high priority to said yet further memory unit and to transmit said pending access request to said access unit with said empty access queue.

As noted above the credit counter value indicating an empty queue may be a moment to switch memory units. In this regard, the arbitration circuitry may have determined that requests to a new memory unit should be prioritised and therefore may have stopped sending further requests to the access unit currently accessing a memory unit that has lower priority requests pending. Thus, the queue in this access unit becomes empty whereupon requests to the new memory unit can be sent to this access unit, which can switch between memory units.

It should be noted that when arbitration circuitry determines that higher priority requests are pending to a different memory unit and that it may be the time for an access unit to switch, it may stop sending requests to that access unit until the queue is empty, whereupon the access unit will switch to a prepare state, or in some cases it may send the requests to the access unit before the queue is empty, the access unit being configured to enter the prepare state on detecting requests to a new memory unit at the head of the queue. Waiting until the queue is empty until the memory requests to a new unit are sent to the access unit does not have a performance penalty and may have an advantage, in that selecting which requests to send is in such a case performed later and further memory requests from the system may have been received and these may have a higher priority.

In some embodiments, a size of a queue to store pending access requests within said two access units is sized in dependence upon a time required to perform said activate request and a time required to perform said access.

In order for the access units to function efficiently the size of the queues need to be appropriate such that the access unit can switch between the prepare and active state not too often but without the queues becoming unduly large with the area overhead that this would encompass. In this regard, the amount of time taken to activate a line compared to the amount of time taken to access data are factors that determine appropriate queue size.

In some embodiments, said arbitration circuitry is configured to select one of said access requests to said yet further memory unit in dependence upon a priority of pending requests to said yet further memory unit and a number of cycles that one of said two access units has accessed said one or said further memory unit for, such that said two access units each access said respective one or said further memory unit for at least a predetermined number of cycles and for longer than said predetermined number of cycles where said pending requests have low priority.

The decision to switch between accessing different memory units can be performed in response to the priority of the requests received from the system. In this regard, each request received has a priority associated with it which may be a quality of service indication indicating how important it is to the performance of the device that this is processed quickly. In addition to this the amount of time that an access unit has accessed a particular memory unit for is also an important factor as switching between memory units has a power and latency cost associated with it and the advantages of the current device would be lost if switching occurred too often. Thus, in some embodiments there is a predetermined number of cycles that each access unit must access a particular memory unit for, assuming there are pending requests. Once this time has passed if a high priority request is received then this is forwarded to an access unit along with other requests to the same memory unit. If only lower priority requests are pending then requests to the current memory unit will continue to be sent and switching between memory units may not occur until some time later.

In some embodiments, the memory access circuitry further comprises a register for storing said predetermined number, said predetermined number being set by a programmer.

It may be that the predetermined number is stored in a register and is set by a programmer. In this regard, at start-up or during idle time the programmer may set this value to a particular number depending on the current operational requirements of the memory. In this regard, it may be that it is desirable not to switch too often between units where power and latency considerations are important, while at other times it may be that quality of service factors have priority and switching is allowed to occur more often.

In some embodiments, said two access units are configured to issue access requests as access and close line requests or access and leave line open requests in dependence upon a signal sent from said arbitration circuitry, said arbitration circuitry selecting a type of request in dependence upon a detected pattern of accesses.

When accessing a memory a line is opened by the activate request and it may be that following the access the line should be closed or alternatively it may be left open if it is predicted that a following request will access that line soon. A decision to leave the line open or closed can be made by the arbitration circuitry in dependence upon a detected pattern of accesses, such that it is determined whether the line is likely to be accessed again shortly and the appropriate access request generated in this way.

In embodiments where there are access requests that access and close lines or access and leave lines open then said two access units may be configured in response to receiving an access request to a different memory unit than previous access requests requested access to, to complete said previous access requests and to send a signal to close all lines in said memory unit previously accessed.

When changing between memory units where lines have been left open they should be closed prior to the memory unit being powered down and thus, in response to a signal to change memory unit any open lines of the previously accessed memory units are closed.

Although the memory can take a number of forms, in some embodiments the memory comprise DRAM and the multiple memory units comprise DRAM ranks.

Dynamic memory such as DRAM may be formed in ranks where the ranks are arranged in parallel and accessed over a bus, a particular rank being selected for access at any one time. As access to DRAM requires activation of lines which requires a lot of charge, the number of line accesses that can be made within a time period is limited by the charge pump associated with the rank. Dividing the memory into multiple ranks and having multiple charge pumps allows a different rank to be accessed while a charge pump from a previous rank is recharging. However, when accessing DRAM tracking of the accesses is required such that properties of the memory are not violated as there is no back pressure from the DRAM. The tracking circuitry is expensive and therefore, where one has multiple ranks it may not be advantageous to duplicate the tracking circuitry for each rank. Thus, for this particular sort of memory, access control circuitry according to embodiments of the present invention is particularly advantageous having two access units that allow two different ranks to be activated without switching between ranks and yet only requires two tracking units.

A second aspect of the present invention provides a DRAM memory comprising a plurality of DRAM ranks performing multiple memory units and memory access circuitry according to a first aspect of the present invention, said DRAM being configured such that one said DRAM ranks is in an active state and open to access at one time and at least one further of said DRAM ranks is in a prepare state such that selected lines can be activated at a same time, and others of said DRAM are in a hibernate power down state at said same time.

A third aspect of the present invention provides a method for controlling access to a memory comprising at least three memory units arranged in parallel with each other, said method comprising:
  receiving a plurality of memory access requests from a system and selecting and forwarding memory access requests to one of two access units, a plurality of memory access requests for accessing one memory unit being selected and forwarded to a first of said two access units, and a plurality of memory access requests for accessing a further memory unit being selected and forwarded to a second of said two access units;
  subsequently selecting and forwarding a plurality of memory access requests for accessing a yet further memory unit to one of said first or second access units;
    receiving memory access requests at said two access units,
    selecting one of said at least three memory units for each of said access units in response to said received memory access requests;
    storing requests in a queue prior to transmitting said requests to said respective memory units;
    tracking said requests sent to said respective memory units; and
    determining when to transmit subsequent requests from said queue; wherein prior to transmitting said requests to said respective memory units:
    setting a state of each of said two access units, said state being one of active, prepare and dormant, said access unit in said active state being operable to transmit both access and activate requests to said respective memory unit, said activate request preparing said access in said respective memory unit and said access request accessing said data, said access unit in said prepare state being operable to transmit said activate requests and not said access requests, said access unit in said dormant state being operable not to transmit either said access or said activate requests; and
    switching states of said two access units periodically and setting not more than one of said access units to said active state at a same time.

A fourth aspect of the present invention provides a memory access means for controlling access to a memory comprising multiple memory units arranged in parallel with each other, said memory access means comprising:
  two access means for selecting one of said multiple memory units in response to a received memory access request and for controlling and tracking subsequent accesses to said selected memory unit, said multiple memory units comprising at least three memory units;
  arbitration means for receiving said memory access requests from a system and for selecting and forwarding said memory access requests to one of said two access units, said arbitration means being for forwarding a plurality of memory access requests for accessing one memory unit to a first of said two access means, and for directing a plurality of memory access requests for accessing a further memory unit to a second of said two access means and to subsequently direct a plurality of memory access requests for accessing a yet further memory unit to one of said first or second access means;
  said two access means comprising;
    storing means for storing received requests in a queue prior to transmitting said requests to said respective memory unit; and
    tracking means for tracking said requests sent to said respective memory units and for determining when to transmit subsequent requests from said queue;
  wherein said control means is for setting a state of each of said two access means, said state being one of active, prepare and dormant, said access means in said active state being for transmitting both access and activate requests to said respective memory unit, said activate request preparing said access in said respective memory unit and said access request accessing said data, said access means in said prepare state being for transmitting said activate requests and not said access requests, said access means in said dormant state being for not to transmitting either said access or said activate requests, said control means being for switching states of said two access means periodically and for setting not more than one of said access means to said active state at a same time.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
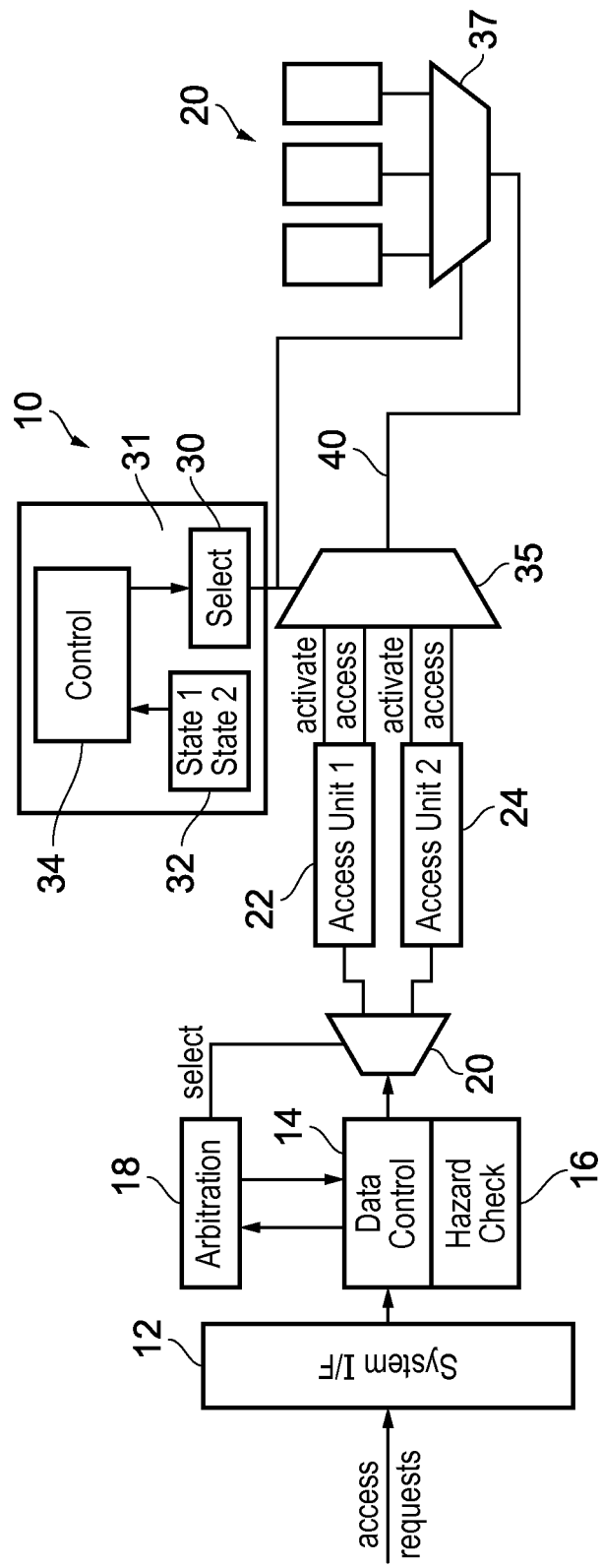
FIG. 1 shows memory access circuitry and a memory according to an embodiment of the present technique.

FIG. 1 shows memory access circuitry 10 according to the present technique for accessing DRAM memory arranged in ranks 20. Access requests are received from a data processing system and are sent via a system interface 12 to a data control block 14 which has much of the data access control such as hazard checking 16 within it.

Data control block 14 is associated with arbitration circuitry 18 which arbitrates between the access requests received and sends selected requests via data control block 14 and multiplexer 20 to one of access unit 1 22 or access unit 2 24. A select signal from arbitration circuitry 18 determines which of the two access units should receive each access request. Pending access requests are stored in queues within each access unit 22 and 24. Each access unit has two queues a prepare queue and an access queue and each request received is entered in both queues. Requests in the prepare queue are requests to activate a line ready for the data to be accessed, the access is then performed later.

Interface control circuitry 31 controls the selection and transmission of requests from the access units 22, 24 to the DRAM 20. It comprises a state store 32 which stores a current state of each of the access units 22, 24, the states being one of either active, prepare or dormant and the value being set by control circuitry 34. Select circuitry 30 selects which of the requests in the queues should be the next request to be transmitted to the DRAM 20 in dependence on the values in state store 32 and on which requests at the head of the four queues are currently valid.

At any one time only one access unit can be in the active state, access units in the active state can send both access and activate requests to the memory, while access units in the prepare state can only send activate requests. Dormant access units do not send requests.

The control circuitry 34 controls the state of the two access units and will switch them between states such that an access unit that was previously active will become either dormant or prepare while the other one will become active. Generally one access unit is active and the other is in the prepare state and this allows a number of access requests to be sent from the active one while activate requests are sent from the other one. On switching state the access requests from the one that was previously in the prepare state can be made efficiently as the lines will have been activated.

Thus, select circuitry 30 selects a request from the access units 22, 24 in dependence upon certain conditions using multiplexer 35 and transmits it via bus 40 and multiplexer 37 to the appropriate rank of the memory. The select circuitry will preferentially select valid access requests from the active unit followed by the activate requests from this unit, followed by activate requests from the access unit in the prepare state.

Figure 2:
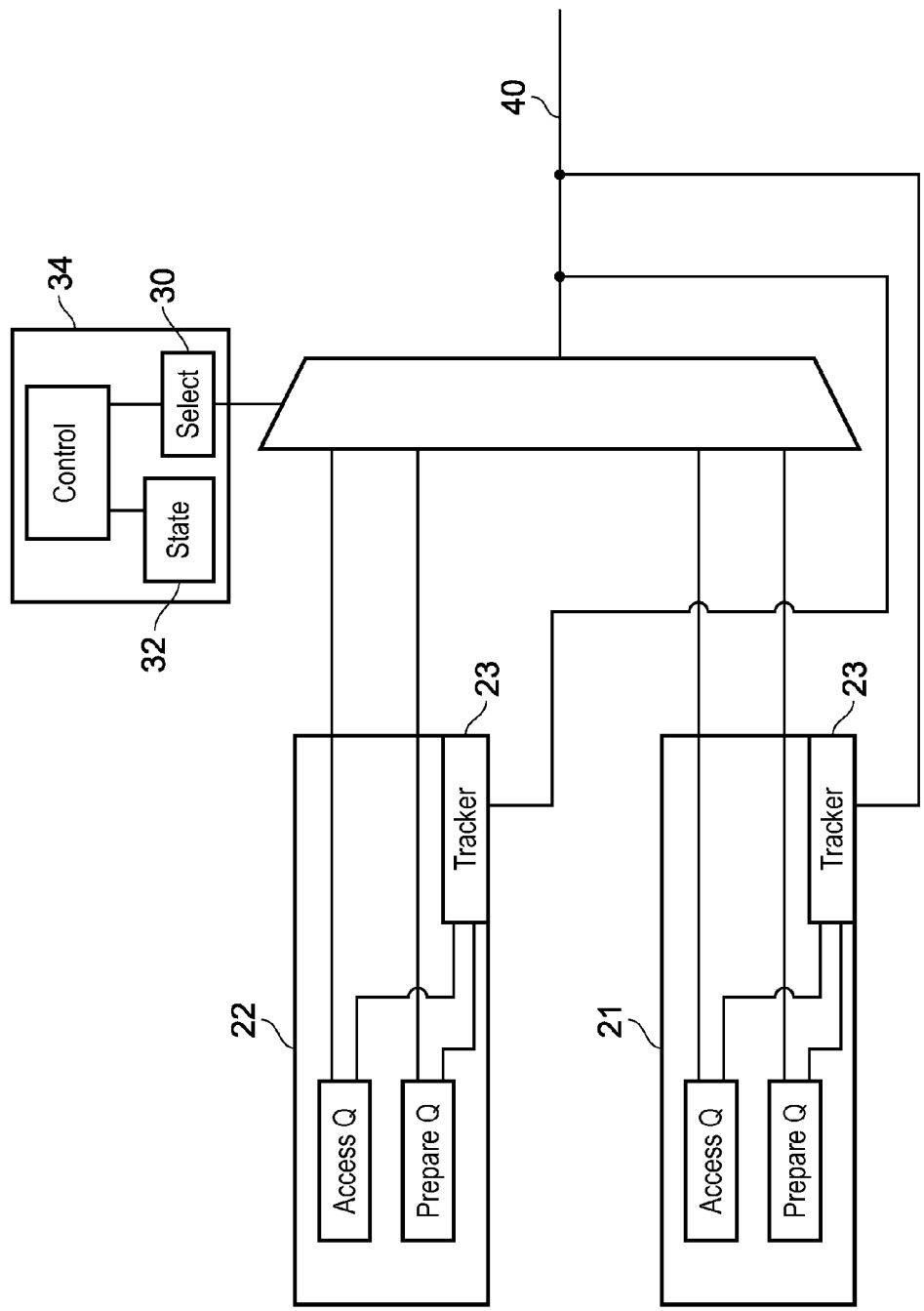
FIG. 2 shows access units and control circuitry for accessing memory according to the present technique.

FIG. 2 shows the access units 22 and 24 in more detail. Access unit 1 22 has an access queue and a prepare queue and tracker circuitry 23. Tracker circuitry 23 will track the accesses that pass along bus 40 to memory and will also track the requests in the queues. It will set the different requests to valid or not valid depending upon whether the memory has capacity to receive a particular request. In this regard, the different memory units that are accessed have particular characteristics that limit the number of times accesses can be made within a certain time period. In the example of DRAM memory charge pumps are used for each rank of the memory and these can perform a number of activates whereupon they need to be recharged which takes some time. The tracker circuitry 23 will detect the number of activates performed in a certain time and will then inhibit any further activate requests from being performed by setting the activate requests to this memory unit to invalid until the required time period has passed. Thus, the select circuitry 30 will select a request from one of the queues depending on whether it is valid and on the state of the units. Thus, the active unit has priority and valid data accesses will be treated first followed by valid activate requests from the active unit followed by valid activate requests from the prepare unit. Once a predetermined time has passed or once no access requests have been sent from the active unit for a predetermined number of cycles then the control circuitry 34 will switch the state of the units by setting the values in state store 32 such that the access unit that was in the prepare state becomes active and the active access unit enters the prepare state. At this point access requests from the new active access unit are given priority.

In the embodiments described above there are two access units and this is generally sufficient to allow interleaving of access and activate requests and increase efficiency. However, in some cases it may be advantageous to have one or more further access units, only one of which will ever be in an active state the others being either in a prepare state or a dormant state. The skilled person would understand that these would be placed in parallel with the two access units shown in FIGS. 1 and 2, with the multiplexer 20 of FIG. 1 selecting one of the several access units to send requests to and multiplexer 35 of FIG. 1 selecting an access unit to output activate or access requests from.

Figure 3:
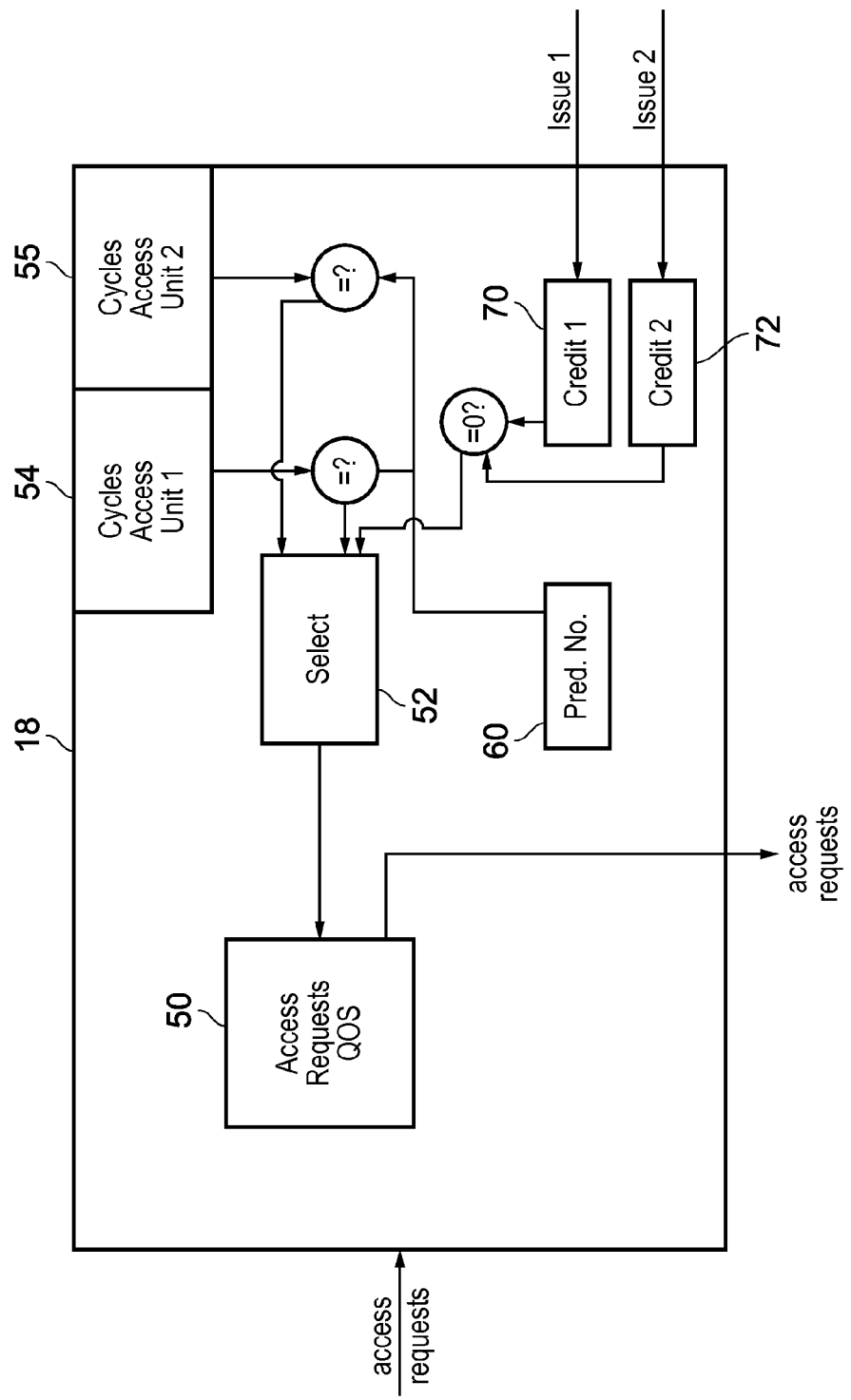
FIG. 3 shows arbitration circuitry for arbitrating between received access requests according to the present technique.

FIG. 3 shows in greater detail the arbitration circuitry 18 of FIG. 1. Arbitration circuitry 18 has a data store 50 that stores pending access requests along with their priority or quality of service indicator. There is also selection circuitry 52 that selects between pending access requests and transmits the selected access requests to the data control block 14 of FIG. 1 for transmission to the access units.

Figure 4:
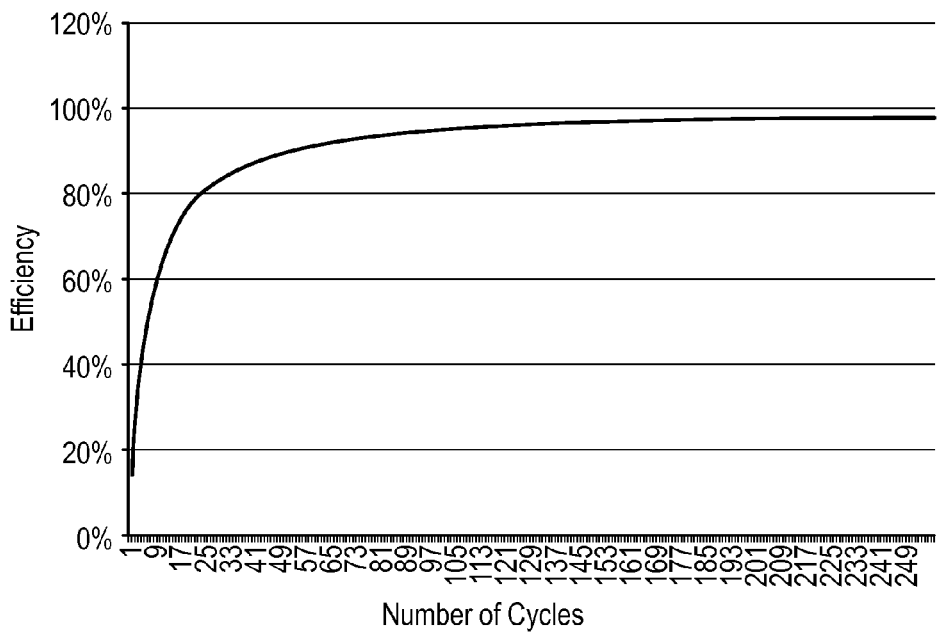
FIG. 4 shows a graph showing how efficiency of the circuitry changes with number of cycles between turnaround.

The selection circuitry 52 receives information from counters 54 and 56 which both count the number of cycles that have occurred since the respective access units last switched between memory units that they access. The values of the counters are compared with the predetermined number stored in register 60. This number is set by a programmer and is used to determine whether the priority of the requests dominates the selection or whether the turnaround time between memory unit switches is set to be reasonably high to reduce the latency and power losses that arise at each switch. In this regard, the diagram of FIG. 4 is relevant and will be discussed later.

Arbitration circuitry 18 also has credit counters 70 and 72 which count the number of access requests currently present in access queues within each of the access units. Thus, the selection circuitry 52 compares the number of cycles that each access unit has currently accessed a particular memory unit for (the value in the counters 54, 55) with the predetermined number and where the counter values are lower then no change of memory unit is scheduled unless one of the credit counters 70, 72 becomes empty implying that there are no access requests in the pending access request queue to that particular memory unit. When the number of cycles in one of counters 54 or 55 reaches the predetermined number then the selection circuitry will not send any further requests to that access unit until it determines that the credit counter value has reached zero and the access queue is empty. At this point it will look at the access requests within the data store and determine if there are high priority access requests to a different memory unit. If there are then it will send these access requests to the access unit with the empty queue. If there are no particularly high priority access requests or the high priority access requests are to the same memory unit as previously accessed then it will send these to the access unit.

The access unit will on receipt of memory access requests to a different memory unit send control signals to the memory to select the new memory unit and refresh and make dormant the previously accessed memory unit. In this way, the number of memory units that are active and powered up at any one time is restricted which reduces power consumption.

Although, in this embodiment the selection circuitry 52 does not select an access request to a new memory unit until it determines from the value of credit counters 70 or 72 that an access queue is empty, in other embodiments it may send access requests to new memory units immediately that it determines one of the cycle access counters 54, 55 is greater than the predetermined number and high priority requests to another memory unit are pending. An advantage of sending the requests only after the credit counters indicate that the access queue is empty is that delaying the sending of the requests to the access unit has no performance penalty but does allows subsequent requests to be received which requests might have a higher priority allowing them to be selected and serviced more quickly. The access unit is in any case configured to respond to an access request at the head of the access queue that is to a different memory unit than a previous access request to switch memory units by refreshing and powering down the previous memory unit and selecting the new one.

FIG. 4 shows a diagram illustrating how the efficiency of accessing the memory varies with rate of turnover between ranks. Thus, if the turnaround between memory units or ranks occurs following very few accesses, the efficiency of the system is quite low due the latency associated with each turnaround which lowers the performance. However, once one reaches a certain number of cycles in this case about 80 then the efficiency is above 90% and switching between memory units can occur without a great cost in performance. Thus, it is important that the predetermined number is selected such that the turnaround does not occur too frequently so that one does not operate at a point on the graph where the efficiency is very low. At a certain point then turnaround can occur without having a large effect on efficiency and thus quality of service may become the governing factor at this point.

Figure 5:
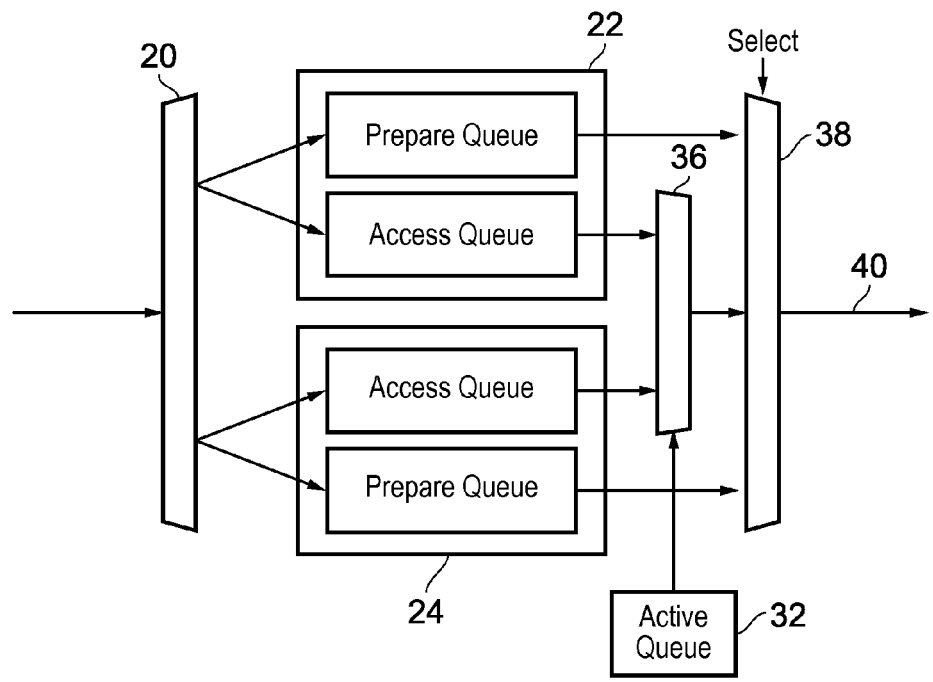
FIG. 5 shows a further example of access units according to the present technique.

FIG. 5 shows an alternative embodiment of the two access units 22, 24 where there are two multiplexers 36, 38 for selecting the request to be output to bus 40 from the four queues. A first multiplexer 36 selects between access queues in dependence upon which of the access unit that is currently active, which it determines from the state bits 32. In this regard, the access queue from the access unit that is not active cannot be selected and having a multiplexer 36 that does not allow this is a convenient way of excluding the access queue of the access unit in the prepare state from the subsequent selection. The subsequent selection is made by multiplexer 38 in dependence upon which requests are valid and the queue they are in (the active access queue having highest priority and the prepare queue of the prepare access unit having the lowest priority).

Figure 6:
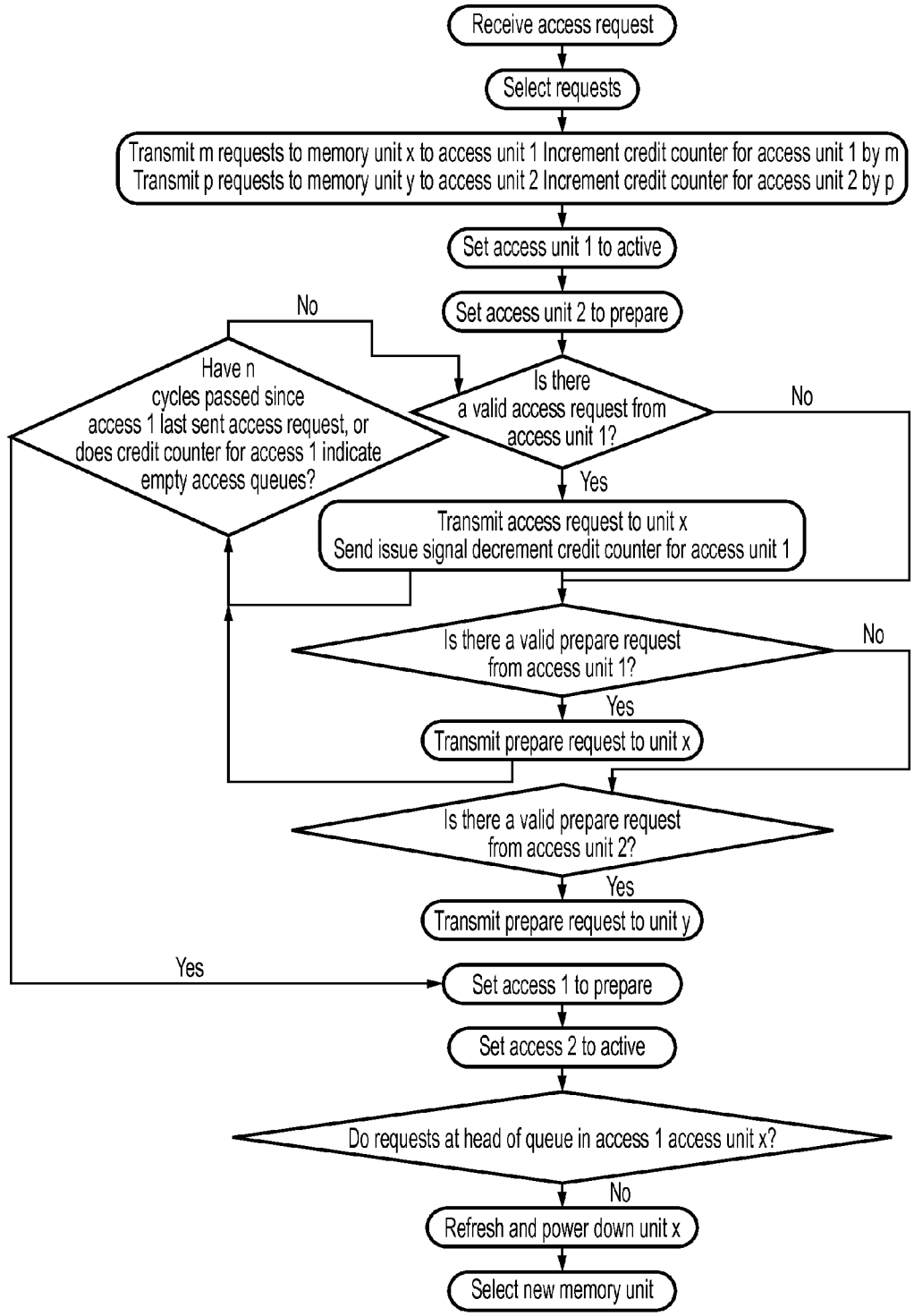
FIG. 6 shows a flow diagram illustrating steps in a method for controlling accesses to a memory.

FIG. 6 shows a flow diagram illustrating steps in a method of transmitting access requests to memory according to a present technique. Access requests are received and a selection is made between the requests using arbitration circuitry. This is described in more detail with respect to FIG. 7.

A number of high priority requests that are to a particular memory unit termed memory unit x are selected and are sent to access unit 1. The credit counter for access unit 1 is then incremented by the number of requests that were sent to access unit 1 in this case m. Requests to a different memory unit also of a high priority are then selected and these p requests are sent to access unit 2 and the credit counter for access unit 2 is incremented by p.

Access unit 1 is then set to active and access unit 2 to prepare and both access units send a select signal to their respective memory units such that the memory units are powered up and awaiting commands.

It is then determined if there is a valid access request for access unit 1. If there is then this access request is selected and is transmitted to memory unit x and an issue signal is sent to the control circuitry that decrements the credit counter for access unit to by 1. It is then determined if n cycles have passed since access 1 last sent an access request or if the credit counter for access 1 indicates an empty access queue. If not then it is determined again if there is a valid access request from access unit 1.

If there is no valid access request from access unit 1 then it is determined if there is a valid prepare request from access unit 1. If there is then this prepare request is sent to memory unit x where it activates the appropriate line. It is then determined if n cycles have passed since access unit 1 last sent an access request or if an access queue is empty which it won't be as the credit counter has not moved in this case. If neither are true then it is again determined if there is a valid access request from access unit 1 and if not if there is a valid prepare request from access unit 1 and if not if there is a valid prepare request from access unit 2. If there a valid prepare request from access unit 2 then this prepare or activate request is sent to unit y and this activates the appropriate line and we then return again via the box that determines if n cycles have passed since access 1 last sent an access request.

When n cycles have passed since access unit 1 last sent a request or if the credit counter for access unit 1 indicates an empty access queue in access unit 1 then access unit 1 is set to prepare and access unit 2 is set to active and the steps are repeated again but with access unit 2 then having the priority such that it is determined first if it has valid access requests or prepare requests before the prepare queue of access unit 1 is looked at.

It is also determined at this point if the requests at the head of the queue in access unit 1 are still to access memory unit x and if they are not then memory unit x is refreshed and powered down and the new memory unit of the requests at the head of the queue in access unit 1 is selected. By selecting the new memory unit when access unit 1 is in the prepare state access unit 2 can be accessing the memory and having priority while access unit 1 switches between the memory ranks. This helps to hide the latency of this step.

Figure 7:
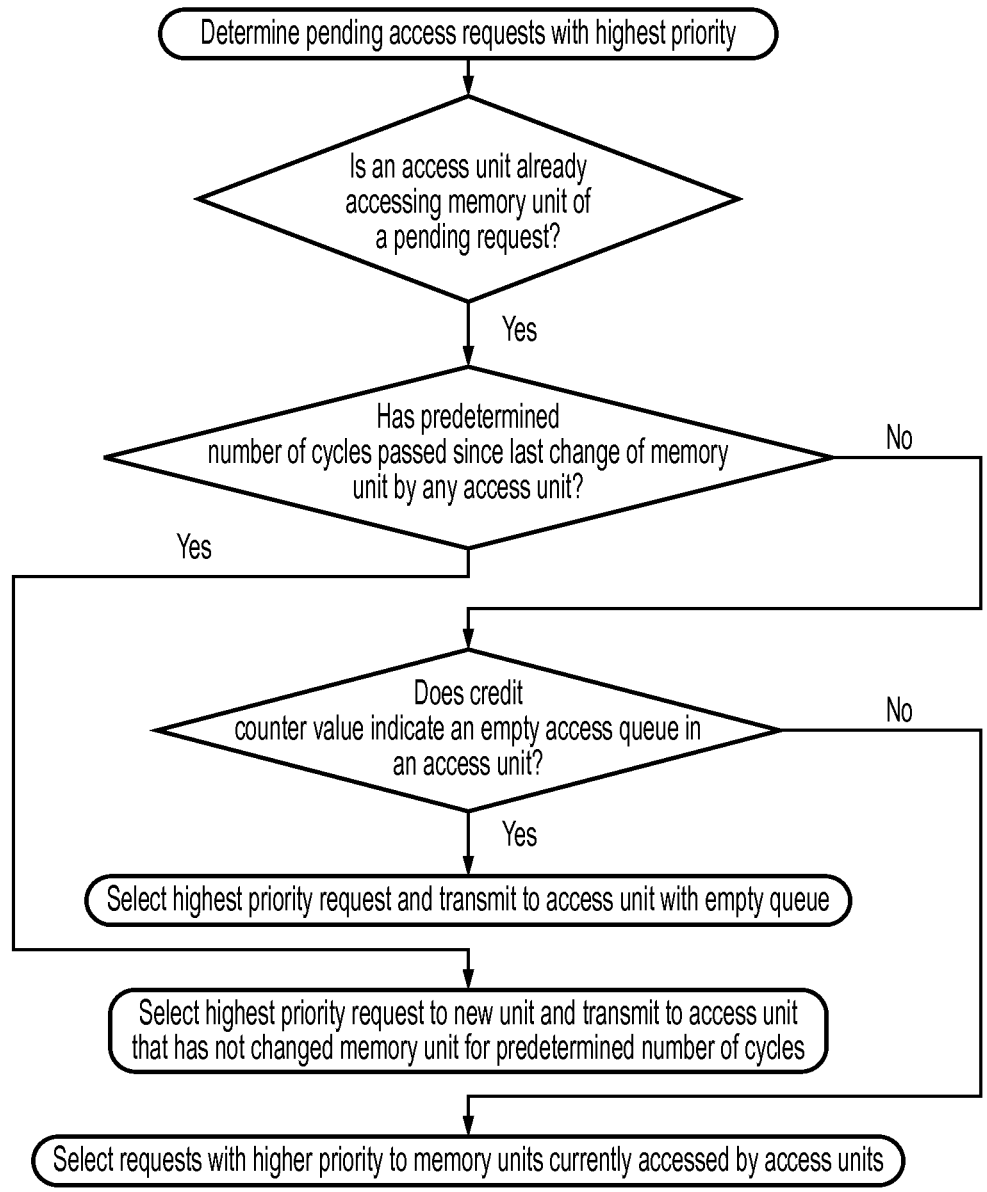
FIG. 7 shows a flow diagram illustrating steps in a method for arbitrating between received requests.

FIG. 7 shows steps performed during arbitration between the different received requests to determine which to send to the respective access units. Initially it is determined which of the pending access requests have the highest priority and it is also determined if an access unit is already accessing memory units of a pending request and if the predetermined number of cycles have passed since the last change of memory unit by any access unit and if the credit counter value indicates an empty access queue in an access unit. If the predetermined number of cycles since the last turnover or switch between memory units has not passed and if there is no empty access queue then the highest priority request to a memory unit that is currently being accessed is selected where one is available and this is sent to the access unit.

If the predetermined number of cycles has passed then it is an indication that a turnover can be affected if required without unduly affecting efficiency. Thus, it is determined if the highest priority requests are to a new memory unit than one currently being accessed. If this is the case then requests to this memory unit are selected and sent to the access unit with the credit counter indicating that the predetermined number of cycles have passed. If the highest priority request is to a memory unit that is currently being accessed then this request is selected and the step of determining which is the highest priority request continues until there is a higher priority request whereupon this access request to the new memory unit is selected.

If it is then determined if there is an empty access queue in an access unit and a highest priority request which may be to a new memory unit is selected and this is sent to the access unit with the empty queue.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

I claim:

1. Memory access circuitry for controlling access to a memory comprising multiple memory units arranged in parallel with each other, said memory access circuitry comprising:
    two access units each configured to select one of said multiple memory units in response to a received memory access request and to control and track subsequent accesses to said selected memory unit, said multiple memory units comprising at least three memory units;
    arbitration circuitry configured to receive said memory access requests from a system and to select and forward said memory access requests to one of said two access units, said arbitration circuitry being configured to forward a plurality of memory access requests for accessing one memory unit to a first of said two access units, and to forward a plurality of memory access requests for accessing a further memory unit to a second of said two access units and to subsequently forward a plurality of memory access requests for accessing a yet further memory unit to one of said first or second access units;
    said two access units comprising:
        storing circuitry to store requests in a queue prior to transmitting said requests to said respective memory unit; and
        tracking circuitry to track said requests sent to said respective memory units and to determine when to transmit subsequent requests from said queue; and
    control circuitry configured to set a state of each of said two access units, said state being one of active, prepare and dormant, said access unit in said active state being operable to transmit both access and activate requests to said respective memory unit, said activate request preparing said access in said respective memory unit and said access request accessing said data, said access unit in said prepare state being operable to transmit said activate requests and not said access requests, said access unit in said dormant state being operable not to transmit either said access or said activate requests, said control circuitry being configured to switch states of said two access units periodically and to set not more than one of said access units to said active state at a same time.

2. Memory access circuitry according to claim 1, further comprising at least one further access unit, wherein there are fewer of said access units than there are of said memory units.

3. Memory access circuitry according to claim 1, wherein said two access units are configured to respond to receiving an access request to a different memory unit than previous access requests requested access to, to complete said previous access requests and to switch to said prepare state.

4. Memory access circuitry according to claim 3, following completion of said previous access requests said tracking circuitry of said two access units are configured to track requests to said different memory unit.

5. Memory access circuitry according to claim 1, wherein said control circuitry is configured to set one of said two access units to said active state and one of said two access units to said prepare state and to switch said two access units between said prepare and said active states in response to not receiving an access request from said active access unit during a predetermined time.

6. Memory access circuitry according to claim 1, wherein said two access units are configured to respond to receiving an access request to a different memory unit than previous access requests requested access to, to transmit a refresh and hibernate signal to said memory unit previously accessed and to transmit a select signal to said memory selecting said different memory unit.

7. Memory access circuitry according to claim 1, wherein said two access units each comprise a prepare queue and an access queue arranged in parallel, requests corresponding to said received access requests being stored in both said prepare and access queue, requests transmitted from said prepare queue triggering activation of a memory line of said request and requests transmitted from said access queue triggering an access to said memory line of said request.

8. Memory access circuitry according to claim 7, comprising interface control circuitry associated with said two access units, said interface control circuitry selecting an access request to transmit to said memory from one of said two access units, said interface control circuitry being configured to preferentially select a valid access request from said access unit in said active state, then a valid activate request from said access unit in said active state and then a valid activate request from said access unit in said prepare state.

9. Memory access circuitry according to claim 8, wherein said tracking circuitry is configured to set a pending request at a front of said prepare and access queues to valid or invalid in dependence upon tracked previous requests sent to said memory unit and properties of said memory unit.

10. Memory access circuitry according to claim 7, wherein said two access units are configured to transmit an issue signal to said control circuitry on issuing of one of said requests from said access queue, said control circuitry determining capacity of said two access units to receive said requests in dependence upon said issue signals.

11. Memory access circuitry according to claim 10, said control circuitry comprising two credit counters each configured to count to a size of said access queue in a respective one of said two access units a value stored in each of said two credit counter being indicative of availability in said respective access queue, said credit counter value being changed in response to a number of access requests sent to said respective access queue and a number of said issue signals received from said respective access units.

12. Memory access circuitry according to claim 11, wherein said arbitration circuitry is configured in response to detecting said credit counter value indicating an empty access queue to select one of said pending access requests of a high priority to said yet further memory unit and to transmit said pending access request to said access unit with said empty access queue.

13. Memory access circuitry according to claim 1, wherein a size of a queue to store pending access requests within said two access units is sized in dependence upon a time required to perform said activate request and a time required to perform said access.

14. Memory access circuitry according to claim 1, wherein said arbitration circuitry is configured to select one of said access requests to said yet further memory unit in dependence upon a priority of pending requests to said yet further memory unit and a number of cycles that one of said two access units has accessed said one or said further memory unit for, such that said two access units each access said respective one or said further memory unit for at least a predetermined number of cycles and for longer than said predetermined number of cycles where said pending requests have low priority.

15. Memory access circuitry according to claim 14, further comprising a register for storing said predetermined number, said predetermined number being set by a programmer.

16. Memory access circuitry according to claim 1, said two access units being configured to issue access requests as access and close line requests or access and leave line open requests in dependence upon a signal sent from said arbitration circuitry, said arbitration circuitry selecting a type of request in dependence upon a detected pattern of accesses.

17. Memory access circuitry according to claim 16, said two access units being configured in response to receiving an access request to a different memory unit than previous access requests requested access to, to complete said previous access requests and to send a signal to close all lines in said memory unit previously accessed.

18. Memory access circuitry according to claim 1, wherein said memory comprises DRAM memory and said multiple memory units comprise DRAM ranks.

19. A DRAM memory comprising a plurality of DRAM ranks forming multiple memory units and memory access circuitry according to claim 1, said DRAM being configured such that one said DRAM ranks is in an active state and open to access at one time and a further at least one of said DRAM ranks is in a prepare state such that selected lines can be activated at a same time, and others of said DRAM are in a hibernate power down state at said same time.

20. A method for controlling access to a memory comprising at least three memory units arranged in parallel with each other, said method comprising:
receiving a plurality of memory access requests from a system and selecting and forwarding memory access requests to one of two access units, a plurality of memory access requests for accessing one memory unit being selected and forwarded to a first of said two access units, and a plurality of memory access requests for accessing a further memory unit being selected and forwarded to a second of said two access units;
subsequently selecting and forwarding a plurality of memory access requests for accessing a yet further memory unit to one of said first or second access units;
receiving memory access requests at said two access units, selecting one of said at least three memory units for each of said access units in response to said received memory access requests;
storing requests in a queue prior to transmitting said requests to said respective memory units;
tracking said requests sent to said respective memory units; and
determining when to transmit subsequent requests from said queue; wherein prior to transmitting said requests to said respective memory units:
setting a state of each of said two access units, said state being one of active, prepare and dormant, said access unit in said active state being operable to transmit both access and activate requests to said respective memory unit, said activate request preparing said access in said respective memory unit and said access request accessing said data, said access unit in said prepare state being operable to transmit said activate requests and not said access requests, said access unit in said dormant state being operable not to transmit either said access or said activate requests; and
switching states of said two access units periodically and setting not more than one of said access units to said active state at a same time.

21. Memory access means for controlling access to a memory comprising multiple memory units arranged in parallel with each other, said memory access means comprising:
two access means for selecting one of said multiple memory units in response to a received memory access request and for controlling and tracking subsequent accesses to said selected memory unit, said multiple memory units comprising at least three memory units;
arbitration means for receiving said memory access requests from a system and for selecting and forwarding said memory access requests to one of said two access units, said arbitration means being for forwarding a plurality of memory access requests for accessing one memory unit to a first of said two access means, and for directing a plurality of memory access requests for accessing a further memory unit to a second of said two access means and to subsequently direct a plurality of memory access requests for accessing a yet further memory unit to one of said first or second access means;
said two access means comprising:
storing means for storing received requests in a queue prior to transmitting said requests to said respective memory unit; and
tracking means for tracking said requests sent to said respective memory units and for determining when to transmit subsequent requests from said queue; and
control means for setting a state of each of said two access means, said state being one of active, prepare and dormant, said access means in said active state being for transmitting both access and activate requests to said respective memory unit, said activate request preparing said access in said respective memory unit and said access request accessing said data, said access means in said prepare state being for transmitting said activate requests and not said access requests, said access means in said dormant state being for not to transmitting either said access or said activate requests, said control means being for switching states of said two access means periodically and for setting not more than one of said access means to said active state at a same time.

* * * * *